INVENTORS:
JOHN PAYNTER,
JOHN R. MORGAN,
by Paul R. Webb, II
THEIR ATTORNEY

United States Patent Office 3,649,361
Patented Mar. 14, 1972

3,649,361
ELECTROCHEMICAL CELL WITH MANGANESE OXIDE CATALYST AND METHOD OF GENERATING ELECTRICAL ENERGY
John Paynter, Burnt Hills, and John R. Morgan, Schenectady, N.Y., assignors to General Electric Company
Filed Oct. 23, 1968, Ser. No. 769,817
Int. Cl. H01m 27/04
U.S. Cl. 136—86 D   7 Claims

ABSTRACT OF THE DISCLOSURE

An electrochemical cell is described which includes a gas diffusion cathode, an alkaline electrolyte and operates at room temperature. The electrochemical cell has an improved gas diffusion cathode which comprises a finely divided, electrically conductive carbon powder and a base metal catalyst of a manganese oxide, or a manganese oxide with one or more other base metal catalysts. Such a cell provides performance approaching that of a cell including a gas diffusion cathode with a platinum catalyst. A method of generating electrical energy from such a cell is also described.

---

This invention relates to electrochemical cells and, more particularly, to electrochemical cells which have at least one gas diffusion electrode containing a non-noble or base metal catalyst, an aqueous alkaline electrolyte, and room temperature operation.

An electrochemical cell with a gas diffusion cathode is a device capable of generating electricity by electrochemically combining an oxidizable reactant, termed a fuel, and a reducible reactant, termed an oxidant. Such cells, each of which is comprised of spaced electrodes ionically connected by an electrolyte, include fuel cells, and metal-air cells. When fuel and oxidant are concurrently and separately supplied to the electrodes of the cell, an electrical potential will develop across the electrodes. When an electrical load is provided across the electrodes an electrical current flows therebetween, the electrical energy thus represented being generated by the electrocatalytic oxidation of fuel at one electrode and simultaneous electrocatalytic reduction of oxidant at the other.

While various non-noble or base metal materials are known to be active for the electroreduction of oxygen in an aqueous alkaline electrolyte cell, such materials can be employed only at cell operating temperatures usually greater than 100° C. to produce a performance similar to a nobe metal catalyst. When such an electrochemical cell employs an alkaline electrolyte and is operated at room temperature, it is generally considered necessary to employ a noble metal as the catalyst for the gas diffusion cathode. A non-noble or base metal material employed as the catalyst shows a serious decline in performance as opposed to a noble metal, such as platinum, which maintains its high level of activity. Thus, while the substitution of a non-noble or base metal catalyst for a noble metal catalyst could be employed in such an aqueous alkaline cell at room temperature, a large loss in performance is encountered, especially if high current drains are required.

Our invention is directed to an improved electrochemical cell, which has an aqueous alkaline electrolyte, operates at room temperature, and has a unique gas diffusion electrode containing a non-noble or base metal catalyst whereby the cell exhibits performance comparable to such a cell employing a gas diffusion cathode with a noble metal.

It is a primary object of our invention to provide an improved electrochemical cell which exhibits high performance at room temperature operation without employing a noble metal for the cathode catalyst.

In accordance with one aspect of our invention, an electrochemical cell has at least one gas diffusion electrode, at least one anode spaced from the cathode, an aqueous alkaline electrolyte in contact with both the cathode and the anode, and the gas diffusion cathode comprises a mixture of a finely divided, electrically conductive carbon powder, and a catalyst material selected from the class consisting of a manganese oxide, and a manganese oxide and at least one other base metal catalyst.

These and various other objects, features and advantages of the invention will be better understood from the following description taken in connection with the accompanying drawing in which.

Figure 1:
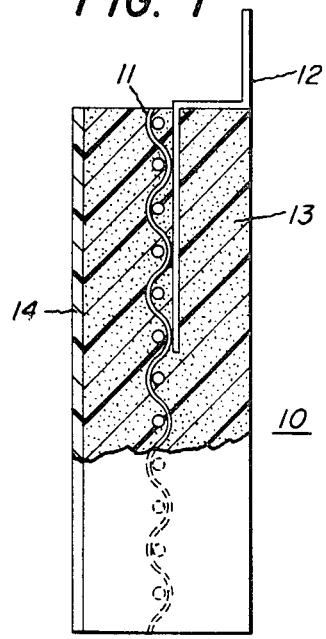
FIG. 1 is a sectional view of a gas diffusion electrode made from finely divided powder in accordance with our invention.

In FIG. 1 of the drawing, there is shown generally an electrode 10 embodying our invention which has a terminal grid in the form of a metal wire screen 11 which serves the functions of transmitting electrical current and providing reinforcement for the electrode. An electrical connection in the form of an electrical lead 12 is connected directly to screen 11. Electrode 10 has at 13 a mixture of a finely divided, electrically conductive powder, and a catalyst material selected from the class consisting of a manganese oxide, and a manganese oxide and at least one other non-noble or base metal catalyst held together by a binder and in electronically conductive relation with wire screen 11. For example, the catalyst is held together and bonded to screen 11 by a binder material of polytetrafluoroethylene (PTFE). Electrode material 13 surrounds both the screen 11 and a portion of electrical lead 12. The ratio of such a binder to the catalyst material may be from about 5 to 50% by weight, with the preferred range being from about 10 to 30% by weight. If desired, a hydrophobic film 14 is shown bonded to one surface of electrode material 13 to prevent electrolyte drowning of electrode 10. This film is desirable if the electrode is to be used with a free aqueous electrolyte.

Figure 2:
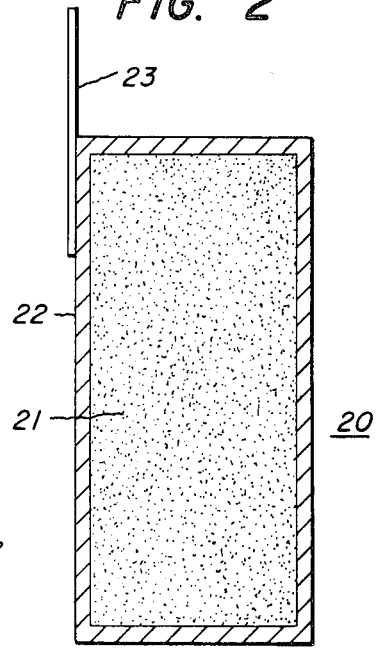
FIG. 2 is a sectional view of a gas diffusion electrode made from a porous substrate in accordance with our invention.

In FIG. 2 of the drawing, there is shown generally an electrode 20 embodying our invention which has an electrically conductive, porous substrate 21, such as carbon, with a catalyst material 22 of a manganese oxide, or a manganese oxide with one or more non-noble or base metal catalysts impregnated into and coating substrate 21. An electrical lead 23 is affixed to electrode 21 in any suitable manner.

Figure 3:
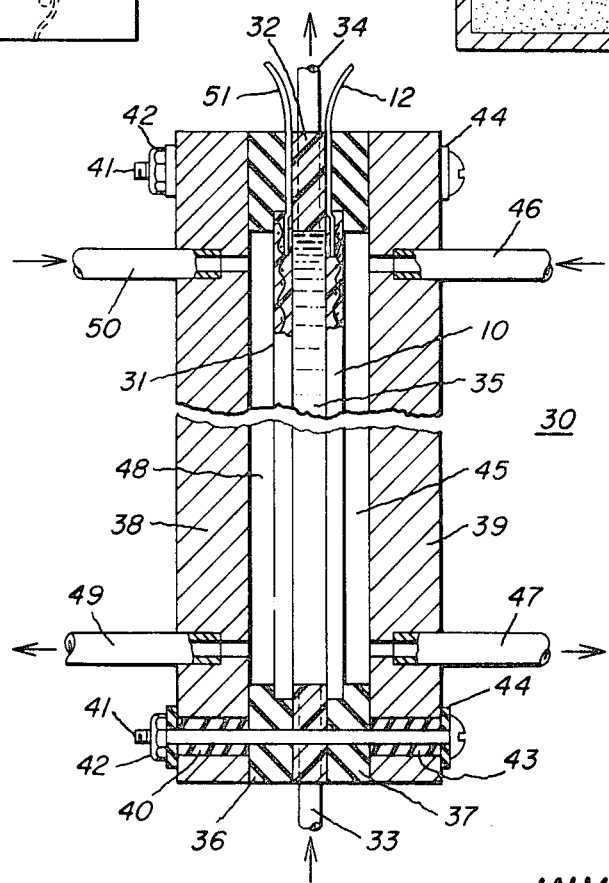
FIG. 3 is a sectional view of a fuel cell employing an electrode of FIG. 1 as its gas diffusion cathode electrode.

In FIG. 3 of the drawing, there is shown generally at 30 an electrochemical cell in the form of a fuel cell embodying our invention which comprises gas diffusion cathode 10 from FIG. 1 of the drawing and an anode 31, separated by an annular electrolyte gasket 32. Electrolyte inlet conduit 33 and electrolyte outlet conduit 34 are sealingly related to the electrolyte gasket to circulate a free aqueous electrolyte to and from electrolyte chamber 35 formed by the anode, cathode and gasket. An anode gasket 36 and a cathode gasket 37 are positioned adjacent opposite faces of the electrolyte gasket to seal therewith and to hold the anode and cathode in assembled relation. Identical end plates 38 and 39 are associated with the anode and cathode gaskets, respectively, in sealing relation therewith. To hold the gaskets and end plates in assembled relation a plurality of tie bolts 40 are provided, each having a threaded end 41 and a nut 42 mounted thereon. To insure against any possibility of internal short circuiting of the fuel cell electrodes, the tie bolts are provided with insulative bushings 43 within each end plate and with an insulative washer 44 adjacent each terminus.

An oxidant chamber 45 is formed by the cathode gasket, cathode, and end plate 39. An oxidant inlet conduit 46 is sealingly associated with the end plate to allow oxidant to be fed to the oxidant chamber while an oxidant outlet conduit 47 is similarly associated with the end plate to allow the purge of oxidant. Where the fuel cell is to be operated on ambient air, no end plate 39 is required. The anode, anode gasket, and end plate 38 similarly cooperate to form a fuel chamber 48. A fuel outlet conduit 49, similar to oxidant outlet conduit 47, is provided. A fuel inlet conduit 50 is shown for providing a fuel to the fuel chamber. An electrical lead 51 is provided for anode 31. Such a fuel cell operates generally on a gaseous fuel.

We discovered unexpectedly that we could form an improved electrochemical cell by providing at least one unique gas diffusion cathode which has a mixture of a finely divided, electrically conductive powder, and a catalyst material selected from the class consisting of a manganese oxide, and a manganese oxide and at least one other non-noble or base metal catalyst. We found also that such a gas diffusion cathode could have the catalyst material coated on the finely divided powder. We found also that a binder could be employed to hold together the electrically conductive powder and the catalyst material or to hold together the catalyst coated powder in electronically conductive relationship. We found further than the above gas diffusion cathode could include an electrically conductive, porous substrate into which is impregnated the catalyst material. In these cathodes we found further that the ratio of the catalyst material to the electrically conductive powder or to the electrically conductive porous substrate material can be varied widely.

The above electrochemical cell includes also at least one anode spaced from the cathode, and an aqueous alkaline electrolyte in contact with both the cathode and anode. We found that such a cell can be operated at room temperature with high performance by supplying air or oxygen to the cathode and a fuel to the anode. Such a cell can be operated as a fuel cell or a metal-air cell.

We found that suitable finely divided powders, which are electrically conductive for employment in our gas diffusion cathode include finely divided powders of carbon, carbon with boron dissolved therein, and mixtures of carbon with boron dissolved therein and boron carbide. We found that suitable electrically conductive porous substrate materials include porous carbon, porous nickel, etc.

We found that a catalyst material of a manganese oxide which is mixed with a finely divided, electrically conductive powder provides a gas diffusion cathode which performs in a manner similar to that of a cathode containing a platinum catalyst when an electrochemical cell including the cathode is operated at room temperature. Additionally, we found that we could add one or more other non-noble metal catalysts to a manganese oxide and the finely divided, electrically conductive powders to form such an improved gas diffusion cathode. Suitable non-noble metal catalysts in addition to manganese oxides include silver, nickel oxide, cobaltous oxide, carbon powder, carbon powder with boron dissolved therein, mixtures of carbon powder with boron dissolved therein and boron carbide, etc.

Such an improved cathode can be formed by various methods. A stable, high surface area catalyst can be prepared by providing a thermally decomposable manganese salt, by mixing together a thermally decomposable manganese salt and a thermally decomposable salt of another non-noble metal, or by mixing together a thermally decomposable manganese salt and a mixture of thermally decomposable salts of other non-noble metals, and by decomposing thermally the manganese salt, or the mixed salts. The resulting catalyst material is mixed with a finely divided, electrically conductive powder to form a gas diffusion cathode. Both the catalyst material and conductive powder can be held together in electrically conductive relationship by a chemically inert binder such as PTFE.

A high area catalyst can also be prepared by forming a solution from a mixture of a thermally decomposable manganese salt, or such a salt and one or more thermally decomposable salts of other non-noble metals, and an aqueous, organic, or organic and aqueous solvent. The solvent is evaporated from the solution, and the manganese salt or the mixed metallic salts are decomposed to form a high surface area catalyst material which can be formed by mixing with a finely divided, electrically conductive powder into an electrode. The catalyst material and conductive powder can be held together in electrically conductive relationship by a chemically inert binder, such as PTFE.

The above solution can be applied to the finely divided, electrically conductive powder to form a supported catalyst material for an electrode or applied to at least a portion of an electrically conductive, porous substrate to form an electrode. The supported catalyst material can also be held together in electrically conductive relationship by a chemically inert binder, such as PTFE.

Various organic and aqueous solvents are suitable for our method of preparing a high surface area catalyst, a supported catalyst, or an electrode. However, we prefer to employ pyridine when salts of organic acids are used and water when salts of inorganic acid are used.

A wide variety of thermally decomposable manganese salts and thermally decomposable salts of other non-noble metals are employable to form the catalyst material of the improved gas diffusion cathode. Suitable manganese salts include manganese nitrate, manganese acetate, manganese formate, manganese carbonate, etc. Similarly, salts of other non-noble metals include nitrates, acetates, formates, carbonates, etc. If one of the above solution methods is employed in the preparation of the catalyst material or electrode structure, the salts must be compatible with each other and soluble in the solvent. After thermal decomposition, the thermally decomposable manganese salt results in a manganese oxide. Since this oxide can be a single oxide of manganese or a mixture of more than one oxide of manganese, the term "a manganese oxide" is employed in this application to include both a single oxide and a mixture of oxides of manganese.

The preferred electrolyte for such an electrochemical cell is an aqueous alkaline solution. As is well understood in the art, the electrolyte may be aqueous alkali solution of any desired concentration. While the alkali metal hydroxides are the most commonly employed and of the lowest cost, it is appreciated that other soluble hydroxides may be employed, such as tetra-substituted ammonium or phosphonium hydroxides.

The anode electrode can be of any conventional construction or configuration including a noble metal catalyst such as platinum, or an alloy of platinum and ruthenium. The electrocatalyst may be employed as a coating on a high area substrate, may be suitably bonded into a porous mass, or supported on a porous substrate of carbon, nickel, etc.

An illustrative operation of a fuel cell made in accordance with our invention comprises the employment of our unique gas diffusion cathode in a fuel cell with a platinum electrode as the anode. The cell was operated with oxygen gas supplied to the cathode and hydrogen fuel supplied to the anode. A 27 weight percent potassium hydroxide solution was used as the electrolyte and the cell was operated at a temperature of 25° C. This cell operated quite satisfactorily and its operation will be discussed further below in one of the examples.

Examples of electrochemical cells with gas diffusion cathodes made in accordance with our invention are set forth below:

EXAMPLE 1

A supported catalyst material was prepared in accordance with our invention by diluting 7.19 grams of 50 weight percent manganous nitrate aqueous solution with water to a volume of 25 milliliters. Carbon powder in the amount of 9.93 grams was added to the solution which was then stirred to obtain a creamy paste. The solvent was evaporated from the mixture by heating the mixture on a hot plate with a surface temperature of 150° C. while the mixture was agitated constantly. The resulting dried powder was ground and then transferred to a 5.5 inch diameter petri dish. The dried powder was then heated further on a hot plate which had a surface temperature of 150° C. for 2½ hours. The temperature was raised to 200° C. for one hour and was raised then to 250° C. for one hour. The heating was continued at 300° C. for one hour, which was then followed by heating at 330° C. for one-half hour. The resulting material was ground and sieved through a 325 mesh screen. The above heating process decomposed thermally the metallic salt on the carbon powder thereby producing a supported catalyst material containing approximately 10 weight percent manganese. This supported catalyst material was then made into a PTFE bonded fuel cell electrode by the method described in U.S. Pat. 3,297,484 issued Jan. 10, 1967, which is incorporated herein by reference. The resulting electrode contained approximately 4.6 milligrams of manganese per square centimeter.

EXAMPLE 2

A supported catalyst material was prepared also in accordance with our invention by the thermal decomposition of manganese acetate on carbon powder. 2.62 grams of manganese acetate was dissolved at a temperature of 85° C. in 13.0 milliliters of pyridine. Carbon powder in the amount of 5.29 grams was added to the solution which was then stirred to obtain a creamy paste. The pyridine solvent was evaporated from the mixture by heating the mixture on a hot plate with a surface temperature of 150° C. while the mixture was agitated constantly. The resulting dried powder was ground and then transferred to a 5.5 inch diameter petri dish. The dried powder was then heated further on a hot plate which had a surface temperature of 200° C. for one hour. The temperature was then raised to 250° C. and the heating continued for 1.5 hours. The heating was continued at 300° C. for two hours, which was then followed by heating at 320° C. for one hour. The resulting material was ground and sieved through a 325 mesh screen. The above heating process decomposed thermally the metallic salt on the carbon powder thereby producing a supported catalyst material containing approximately 10 weight percent manganese. This supported catalyst material was then made into a PTFE-bonded fuel cell electrode by the method described in U.S. Pat. 3,297,484 issued Jan. 10, 1967, which is incorporated herein by reference. The resulting electrode contained approximately 3.8 milligrams of manganese per square centimeter.

EXAMPLE 3

An unsupported catalyst material was prepared in accordance with our invention by the thermal decomposition of manganous acetate, and silver acetate. 33.46 grams of manganous acetate and 11.60 grams of silver acetate were mixed together and placed on a 5.5 inch diameter petri dish. The powders were heated on a hot plate which had a surface temperature of 150° C. for one and one-half hours. The resulting material was ground and sieved through a 325 mesh screen. The temperature was then raised to 200° C. and the heating continued for one-half hour. The heating was continued at 250° C. for one-half hour which was then followed by heating at 275° C. until the powder ignited. The final heating was at 325° C. for one and one-half hours. The resulting material was ground and sieved through a 325 mesh screen. The above heating process decomposed thermally the mixture of metallic salts thereby producing an unsupported catalyst material which contained approximately 50 weight percent manganese and 50 weight percent silver. Fifty weight percent of carbon powder was added to and mixed with the decomposed salts, and was then made into a PTFE-bonded fuel cell electrode by the method described in the above patent. The resulting electrode contained approximately 11 milligrams of manganese and approximately 11 milligrams of silver per square centimeter.

EXAMPLE 4

A supported catalyst material containing 10 weight percent platinum on carbon was purchased commercially. This supported catalyst was then made into a PTFE-bonded fuel cell electrode by the method described in the above patent. The electrode contained 4.6 milligrams of platinum per square centimeter.

EXAMPLE 5

Carbon powder was formed into a PTFE-bonded fuel cell electrode by the method described in the above patent. This electrode contained 58 milligrams of carbon per square centimeter.

EXAMPLE 6

Five electrochemical cells were assembled as shown in FIG. 3 of the drawing. Each cell employed a platinum anode, contained an electrolyte of 27 weight percent potassium hydroxide, and was operated at a temperature of 25° C. Oxygen was supplied to each cathode as the oxidant while hydrogen was supplied to each anode as the fuel. These cells which are set forth below under cell numbers 1–5, which correspond to example numbers 1–5, contain the respective cathode of each of the above examples. In Table I below there is shown the voltage in volts with internal resistance loss removed between the cathode and a hydrogen reference electrode in the same electrolyte, and the current density in milliamperes per square centimeter.

TABLE I

| Current density, ma./cm.² | Cell 1, Cathode 1 to reference volts | Cell 2, Cathode 2 to reference volts | Cell 3, Cathode 3 to reference volts | Cell 4, Cathode 4 to reference volts | Cell 5, Cathode 5 to reference volts |
|---|---|---|---|---|---|
| 1 | 0.93 | 0.93 | 0.95 | 0.95 | 0.85 |
| 2 | 0.92 | 0.91 | 0.94 | 0.94 | 0.84 |
| 5 | 0.90 | 0.89 | 0.93 | 0.92 | 0.82 |
| 10 | 0.89 | 0.87 | 0.90 | 0.91 | 0.80 |
| 20 | 0.87 | 0.85 | 0.88 | 0.89 | 0.78 |
| 60 | 0.82 | 0.79 | 0.83 | 0.87 | 0.71 |
| 80 | 0.81 | 0.77 | 0.81 | 0.86 | 0.67 |
| 120 | 0.78 | 0.74 | 0.78 | 0.84 | 0.57 |
| 160 | 0.76 | 0.72 | 0.76 | 0.82 | 0.48 |

It will be seen from above Table I that cells 1, 2 and 3, which include a cathode having at least one-non-noble metal made in accordance with our invention provided high performance similar to cell 4 whose cathode includes a platinum catalyst. Cell 5 has a cathode which employs only carbon.

While other modifications of the invention and variations thereof which may be employed within the scope

What we claim as new and desire to secure by Letters Patent of the United States is:

1. An electrochemical cell comprising at least one anode, and at least one gas diffusion cathode spaced from the anode, the gas diffusion cathode comprising a mixture of a powder and a catalyst in which the powder and the catalyst consists of finely divided, electrically conductive carbon powder in an amount from 22.0 to 41.4 milligrams per square centimeter, and a catalyst material with with a metal content from 3.8 to 22.0 milligrams per square centimeter, the catalyst selected from the class consisting of a mixture of a manganese oxide and a manganese oxide and at least one other base metal catalyst, the amounts of powder and catalyst being so selected to produce a voltage in a range from 0.95 to 0.72 volt plotted against current density in a range from 1 to 160 milliamperes per square centimeter.

2. An electrochemical cell as in claim 1, in which an aqueous alkaline electrolyte is in contact with both the anode and the cathode.

3. An electrochemical cell as in claim 1, in which a binder holds the electrically conductive powder and catalyst material together in electrically conductive relationship.

4. An electrochemical cell as in claim 1, in which the catalyst material is coated on the finely divided powder.

5. An electrochemical cell as in claim 4, in which a binder holds the catalyst coated powder together in electrically conductive relationship.

6. An electrochemical cell comprising at least one anode, and at least one gas diffusion cathode spaced from the anode, the gas diffusion cathode comprising an electrically conductive, porous substrate, and a catalyst material with a metal content from 3.8 to 22.0 milligrams per square centimeter impregnated in and coated on the substrate, the catalyst material selected from the class consisting of a mixture of a manganese oxide and a manganese oxide and at least one other base metal catalyst, the amount of said catalyst material being so selected to produce a voltage in a range from 0.95 to 0.72 volt plotted against current density in a range from 1 to 160 milliamperes per square centimeter.

7. In a method of generating electrical energy from an electrochemical cell comprising providing at least one gas diffusion cathode, supplying an air oxidant to the cathode, providing at least one anode spaced from the cathode, supplying fuel to the anode, providing an aqueous alkaline electrolyte in contact with both the cathode and the anode, the improvement comprising providing a gas diffusion cathode comprising a mixture of a powder and a catalyst in which the powder and the catalyst consist of finely divided, electrically conductive carbon powder in an amount from 22.0 to 41.4 milligrams per square centimeter, and a catalyst material with a metal content from 3.8 to 22.0 milligrams per square centimeter, the catalyst selected from the class consisting of a manganese oxide and a mixture of a manganese oxide and at least one other base metal catalyst, and applying an electrical load across the cathode and the anode wherein the voltage with internal resistance loss removed between the cathode and a hydrogen reference electrode in the same electrolyte is in a range from 0.95 to 0.72 volt plotted against current density in a range from 1 to 160 milliamperes per square centimeter.

References Cited

UNITED STATES PATENTS

| | | | |
|---|---|---|---|
| 2,669,598 | 2/1954 | Marko et al. | 136—86 UX |
| 3,198,666 | 8/1965 | Gruneberg et al. | 136—86 |
| 3,300,344 | 1/1967 | Bray et al. | 136—86 |
| 3,369,938 | 2/1968 | Kroeger et al. | 136—86 |
| 3,393,100 | 7/1968 | Niedrach | 136—86 UX |
| 3,425,874 | 2/1969 | Maget et al. | 136—86 |
| 3,432,355 | 3/1969 | Niedrach et al. | 136—86 |

ALLEN B. CURTIS, Primary Examiner

UNITED STATES PATENT OFFICE
CERTIFICATE OF CORRECTION

Patent No. 3,649,361  Dated March 14, 1972

Inventor(s) John Paynter and John R. Morgan

It is certified that error appears in the above-identified patent and that said Letters Patent are hereby corrected as shown below:

Column 7, line 15, cancel "mixture of a";

Column 7, line 15, after "a" (second occurrence) insert --mixture of a--;

Column 7, line 40, cancel "mixture of a";

Column 7, line 40, after "a" (second occurrence) insert --mixture of a--.

Signed and sealed this 12th day of December 1972.

(SEAL)
Attest:

EDWARD M. FLETCHER, JR.
Attesting Officer

ROBERT GOTTSCHALK
Commissioner of Patents